United States Patent [19]
Krysiak et al.

[11] 4,160,052
[45] Jul. 3, 1979

[54] CORNER FOR DECORATIVE AND PROTECTIVE MOLDING STRIP

[75] Inventors: Brian T. Krysiak, North Royalton; James M. Kunevicius, Richfield; Bruce C. Leslie, Garfield Heights, all of Ohio

[73] Assignee: Lof Plastics Inc., Detroit, Mich.

[21] Appl. No.: 824,410

[22] Filed: Aug. 15, 1977

[51] Int. Cl.² .................. B60R 13/02; B60R 13/04
[52] U.S. Cl. .................................... 428/31; 52/716; 293/102; 296/41; 428/130; 156/211; 156/257; 156/258
[58] Field of Search ............. 428/31, 121–122, 428/130, 192; 156/211, 257–258; 49/475, 479, 462; 52/288, 716; 293/62, DIG. 4, DIG. 1; 296/41, 137 A; 264/153, 138

[56] References Cited
U.S. PATENT DOCUMENTS

| | | | |
|---|---|---|---|
| 1,808,423 | 6/1931 | Macklanburg | 428/22 |
| 2,299,955 | 10/1942 | Spraragen | 49/479 |
| 3,706,173 | 12/1973 | Taylor | 49/462 |

Primary Examiner—George F. Lesmes
Assistant Examiner—Alexander S. Thomas
Attorney, Agent, or Firm—Collins, Oberlin & Darr

[57] ABSTRACT

A corner construction providing for planar deflection of a molding strip along its longitudinal axis. A V-shaped segment is removed along one side edge of the strip while a continuous band remains along the other edge. Portions are removed between the V-shaped segment and the continuous band whereby the strip can be deflected to permit a change in direction upon application to a mounting surface. The dimensions of the V-shaped segment and intermediate portions are selected to provide the strip with an uninterrupted corner of pleasing appearance having the desired angle of deflection.

17 Claims, 11 Drawing Figures

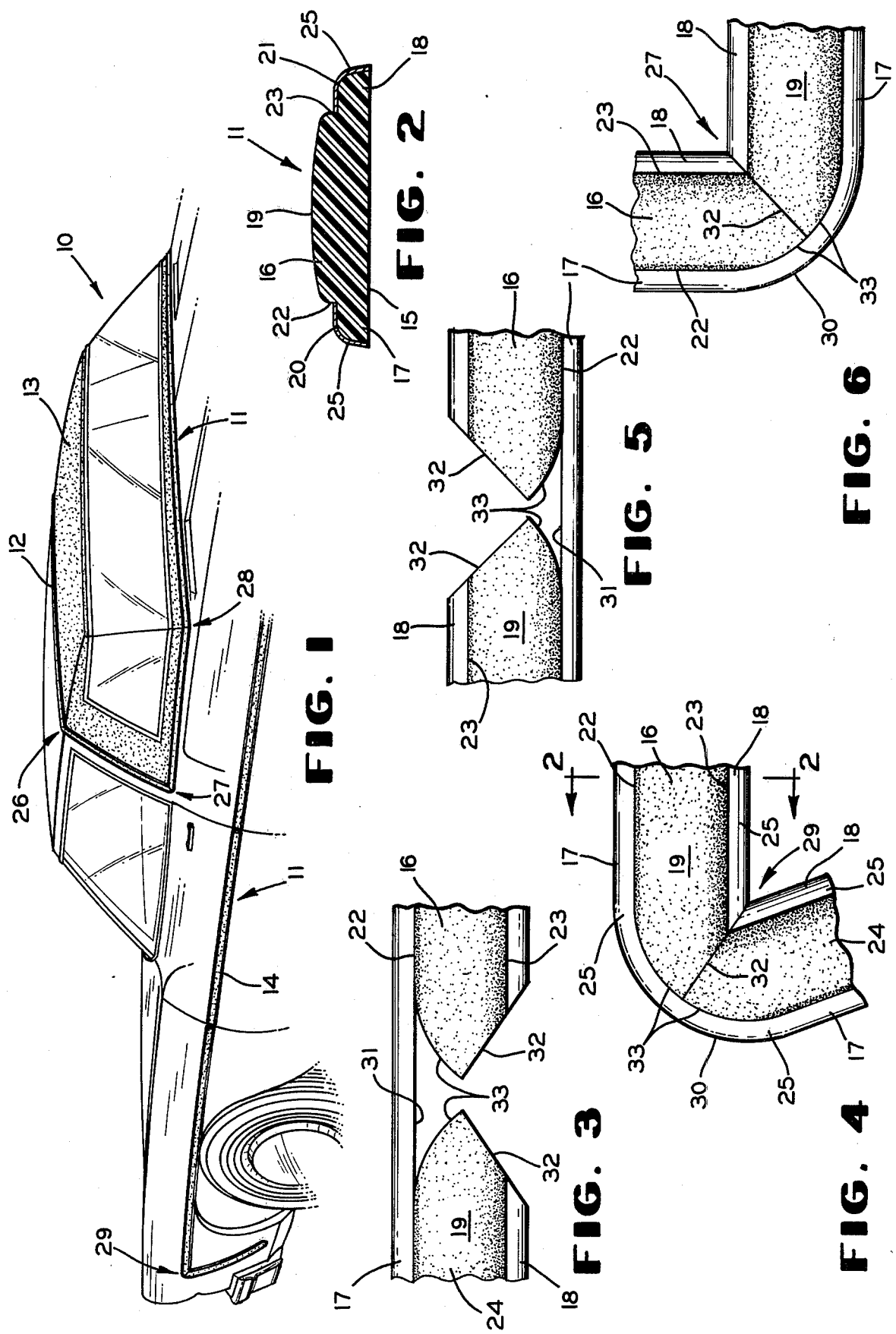

CORNER FOR DECORATIVE AND PROTECTIVE MOLDING STRIP

BACKGROUND OF THE INVENTION

1. Field of the Invention

This invention relates to a protective and decorative molding strip for automobiles and the like, and more particularly to a corner arrangement which permits such molding strips to be deflected through a desired angle in the plane of their body.

2. Description of the Prior Art

The molding or trim strips of U.S. Pat. Nos. 3,439,905, 3,531,348 and 3,572,798 to Alex Kunevicius are representative of many such decorative and protective strips disclosed in the prior art. Such strips are generally relatively thin, straight, resilient, extruded members having a flat rear surface and a curved or sculptured front surface provided with a decorative effect to give a desired pleasing appearance. The strips are affixed to a supporting surface as by means of various fasteners, by being inserted in a metal backing strip, or by an adhesive layer affixed to their rear surface. The strips disclosed in the aforementioned patents are secured to the body surface of a motor vehicle or the like by an adhesive layer, and it is with strips of this type which the present invention is particularly concerned.

Because of the cross sectional configuration of the strips, that is, the width being several times the thickness, and the nature of the material from which they are ordinarily fabricated, they can generally be bent or deflected about their minor axis through relatively sharp angles to follow the contour of the surface to which they are affixed. However, it is not practicable to bend or deflect them abruptly along their major axis in the plane of the strip so as to form angular corners. In order to accomplish this, it was heretofore necessary to sever the strip and form a joint with the two sections having mitered abutting ends. U.S. Pat. No. 3,635,787 to Shanok suggests a molding strip having a series of longitudinally extending notches in the rear surface which permit it to be bent about its longitudinal axis from a planar to an angular shape for application around an outside or inside corner while preserving its continuity. However, such an arrangement would not be of assistance in or suggestive of bending a molding strip along its longitudinal axis in the plane of the strip while maintaining continuity of the strip.

SUMMARY OF THE INVENTION

In accordance with the present invention, an elongated strip is perforated and has portions removed according to a predetermined pattern so that when it is deflected through a desired angle, the strip will present a smooth, continuous, pleasing appearance.

It is, therefore, an object of the invention to provide a decorative and protective molding strip which can be deflected in the plane of the strip through a desired angle along its longitudinal axis.

Another object of the invention is to provide such a strip which will have in its deflected position a smooth, continuous, pleasing appearance.

Another object of the invention is to permit application of such strips is desired non-linear patterns.

Still another object is to provide such a molding strip in one continuous piece which can be deflected through a predetermined angle for easy application.

Other objects and advantages of the invention will become more apparent during the course of the following description, when taken in connection with the accompanying drawings.

BRIEF DESCRIPTION OF THE DRAWINGS

In the drawings, wherein like numerals refer to like parts throughout:

FIG. 1 is a perspective view of a portion of an automobile body to which has been applied decorative molding strips embodying the invention;

FIG. 2 is a transverse section through a typical molding strip, taken substantially along line 2—2 of FIG. 4;

FIG. 3 is a plan view of a molding strip illustrating the portions removed to permit formation of a corner having an included acute angle;

FIG. 4 is a plan view showing the molding strip of FIG. 3 in its deflected position as mounted upon a supporting surface;

FIG. 5 is a plan view similar to FIG. 3 illustrating the portions removed for constructing a 90° corner;

FIG. 6 is a plan view similar to FIG. 4 illustrating the molding strip of FIG. 5 in its deflected position;

DESCRIPTION OF THE INVENTION

Figure 7:
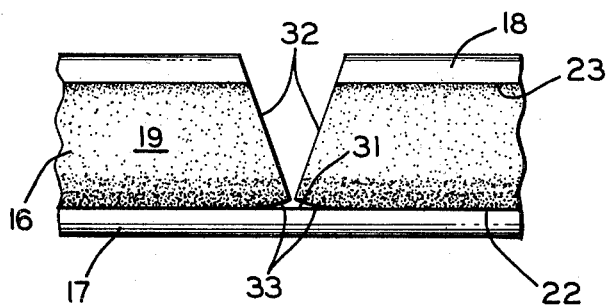
FIG. 7 is a plan view similar to FIGS. 3 and 5 illustrating a configuration of the molding strip for deflecting the strip to an included angle greater than 90°.

Referring to the drawings, there is illustrated in FIG. 1 a portion of an automobile body 10 having affixed thereto decorative and protective molding strips, shown generally at 11, embodying the invention. More particularly, the strips 11 include a top molding 12 surrounding a so-called "vinyl roof" covering 13 to provide a finished and pleasing appearance thereto, and a body side molding 14 extending along the side of the automobile body 10 to both protect it from damage by swinging doors of adjacent automobiles and provide a pleasing appearance. Such molding strips may be applied at various locations and in numerous configurations, either during original assembly of the vehicle or added later at the option of the owner. As aforementioned, the strips themselves, their cross sectional configuration, composition and manner of attachment are well known in the prior art and will not be described in detail herein except as necessary for defining the present invention.

Heretofore, such molding strips were generally applied along a straight line or bowed slightly as permitted by the resiliency of the material from which they were made. For an abrupt change in direction, two separate sections having mitered ends were affixed in abutting relation. Such corners are difficult and time-consuming to assemble in proper alignment, and tend over a period of time to separate, leaving a gap between the adjacent ends. Furthermore, a sharp point is created at the outer extremity of the joint and, particularly for angles of less than 90°, the joint is relatively wide at the point of juncture so that it does not present a pleasing appearance. A corner constructed in accordance with the present invention, on the other hand, has a continuous outer surface and is of generally uniform width regardless of the angle of deflection, so that the molding strip is easy to apply and retains a pleasing appearance.

While the molding strip 11 may take many shapes, one such strip which is particularly adapted for use with the invention is illustrated in cross section in FIG. 2. Thus, the strip may be an extruded integral section of a suitable plastic material such as polyvinyl chloride having a flat rear surface 15 for attachment to a mounting surface as by an adhesive layer (not shown), with a central portion 16 and integral side portions 17 and 18 extending along either side thereof. The central portion is provided with a generally convex outer surface 19. The side portions 17 and 18 have curved outer surfaces 20 and 21, respectively, which merge with the central portion along lines of demarcation 22 and 23, respectively. The surface 19 may be embossed as shown at 24 in FIG. 4, or otherwise imprinted for decorative purposes. There may also be provided on the curved surfaces 20 and 21 an adhered film layer 25, for example of metallized polyethylene terephthalate, which will cause the strip to appear as a plastic insert in a bright chrome mounting strip.

As illustrated in FIG. 1 in connection with the top molding strip 12 and the body side molding strip 14, it may be desirable for the strip to be deflected through various angles from acute to obtuse depending upon the application. The invention is applicable to strips having any cross sectional configuration. However, as a practical matter, the width of such strips is generally several times the thickness. For example, the width may be on the order of thirty mm and the thickness five or six mm. The strips are generally somewhat resilient and flexible so that they can be twisted about the longitudinal or major axis or bent about the minor or transverse axis to follow the contour of the automobile body 10. One such bend about the minor axis is shown at 26 (FIG. 1) where the molding strip 12 extends upwardly along the side and over the roof of the automobile body 12. However, they cannot be similarly bent to any significant degree in the plane of the molding strip as for an approximate right angle bend 27 or an obtuse angle bend 28 necessary for outlining the vinyl roof covering 13. The body side molding 14 is deflected through an acute angle bend 29 to achieve the desired styling effect.

In accordance with this embodiment of the invention the acute, right and obtuse angle bends are achieved by severing and removing segments of the molding strips as shown generally in FIGS. 3, 5 and 7, respectively. Thus, in order to achieve a continuous rounded external edge 30 in the bent molding strip, a line of severance 31 is made along the line of demarcation 22 between the side portion 17 and the central portion 16. Diagonal lines of severance 32, at an angle dependent upon the included angle to which the molding strip is to be deflected, extend inwardly from the opposite edge across the side portion 18 and into the central portion 16. Arcuate lines of severance 33 extend from the line of severance 31 to intersect the diagonal lines 32. With the portion thereof defined by the lines of severance 31, 32 and 33 removed, the molding strips of FIGS. 3, 5 and 7 can then be deflected into the angular positions of FIGS. 4, 6 and 8, respectively. In the bent or deflected position the diagonal lines of severance 32 are brought together, while the arcuate lines 33 form a continuous curve with which the line of severance 31 merges, so that the side portion 17 forms a continuous curved band around the bend in the molding strip. The ends of the side portion 18 and central portion 16 created by the diagonal lines of severance 32, as well as the walls created by the severance lines 31 and 33, are pulled together in tightly abutting relationship by the side portion 17 so that a joint of pleasing appearance is created.

Figure 9:
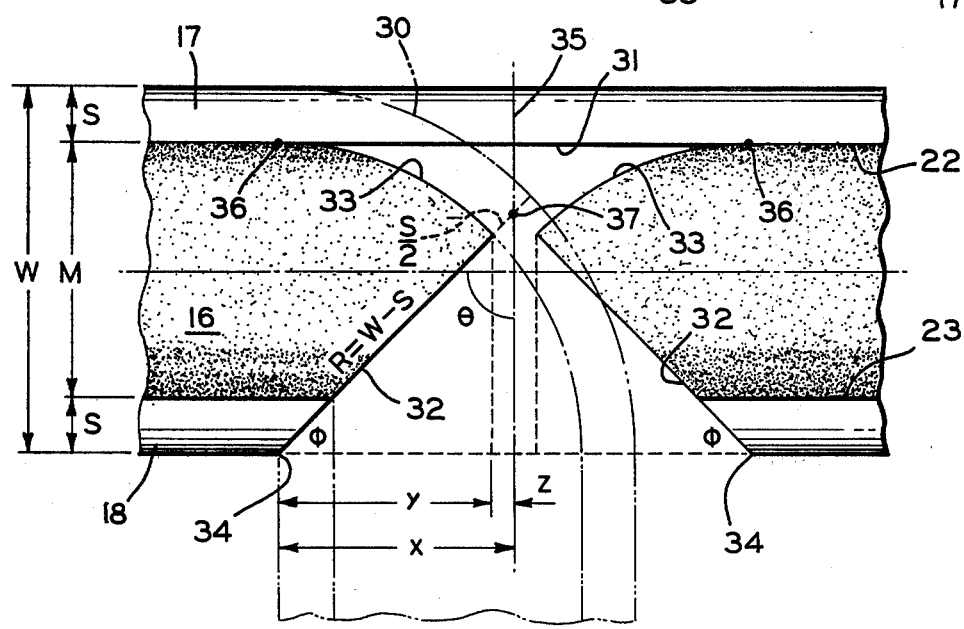
FIG. 9 is a diagram illustrating generally the relationship between the various portions of a molding strip for producing a corner of any desired angle in accordance with the invention.

The geometric configuration of a typical corner is illustrated in FIG. 9, with the straight molding strip having the portions removed being shown in solid lines and the member as deflected into its final configuration shown in broken lines. By way of example, one such molding strip formed of a resilient vinyl material with which the present invention has been successfully employed has a total width of about 30 mm, with the side portions 17 and 18 each having a width S of about 4 mm and the central portion 16 a width M of 22 mm. The thickness of the side portions 17 and 18 at the lines of demarcation 22 and 23 is about 4 mm and the thickness of the central portion 16 is about 6 mm.

The principle of the invention may be employed with a molding strip having any cross sectional configuration. It is particularly well adapted to a configuration such as illustrated in FIG. 2 since the line of demarcation 22 serves as a natural dividing line to set off the side portion 17 which is to continue around the bend in the strip.

While it will be understood that in accordance with the invention the geometric configuration of the lines of severance 31, 32 and 33 for any type of molding strip may be derived empirically, they may also be calculated mathematically as illustrated in FIG. 9 for the embodiments of FIGS. 3 through 8. Thus, assuming the angle included between the longitudinal axes of the two portions of the molding strip on either side of the corner has a value of $\theta$ or, in other words, the angle through which the strip is deflected equals $180° - \theta$, the angles $\phi$ which the diagonal lines of severance 32 make with the longitudinal axis and with the parallel edge of the strip 11 at the points 34 where they intersect the edge, will each then be $\theta/2$. The points 34 are at a distance X from a transverse plane 35 located at the midpoint of the section which is to form the curved portion of the strip. Thus, the line of severance 32 passes through the point 34 and extends inwardly at the angle $\theta$ to the edge and to the longitudinal axis of the strip until it intersects the arcuate line of severance 33.

The line 33 is an arc having a radius R equal to the total width W of the strip minus the width S of the side portion 17, and its center at the point 34. The arcuate line 33 extends from the point of intersection with the diagonal line 32 to a point 36 at which it is tangent to the line of demarcation 22. The point 36 is also in the transverse plane passing through the point 34 and the line of severance 31 extends between the two points of tangency 36.

As will be apparent in FIG. 9, the distance X of the point 34 from the midpoint plane 35 is comprised of a segment Y based upon the radius R and a segment Z based upon the width S of the side portion 17. In its curved position the neutral axis of the side portion 17 will intersect the mid-point plane 35 at a point 37 along the extension of the line of severance 32, and the distance from the point 37 to the line 33 will be $\frac{1}{2}S$. Thus, the distance X may be determined as follows:

$$X = Y + Z$$

$$X = R \cos \phi + \tfrac{1}{2} S \cos \phi$$
$$X = (R + \tfrac{1}{2} S) \cos \phi$$
$$X = (W - S + \tfrac{1}{2} S) \cos \phi$$
$$X = (W - \tfrac{1}{2} S) \cos \phi$$

or, since, $$\phi = \theta/2, \; X = (W - \tfrac{1}{2} S) \cos \theta/2$$

Figure 8:
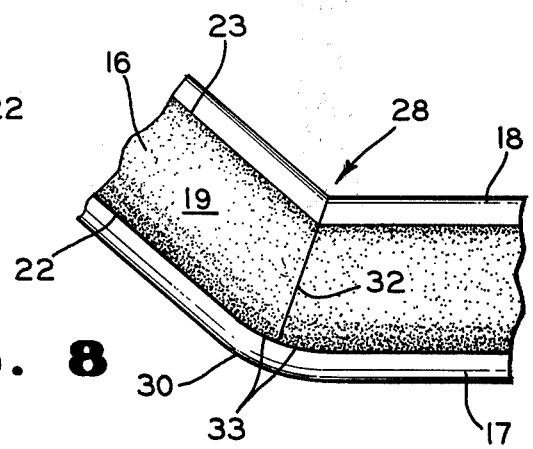
FIG. 8 is a plan view similar to FIGS. 4 and 6 illustrating the molding strip of FIG. 7 in assembled form.

With the material of the molding strip severed along the lines 31, 32 and 33 and the thus bounded portion removed, the ends can be deflected to bring the edges formed by the lines of severance into abutting relationship in the aforementioned manner and form the closed corner as illustrated in FIGS. 4, 6 and 8.

Figure 10:
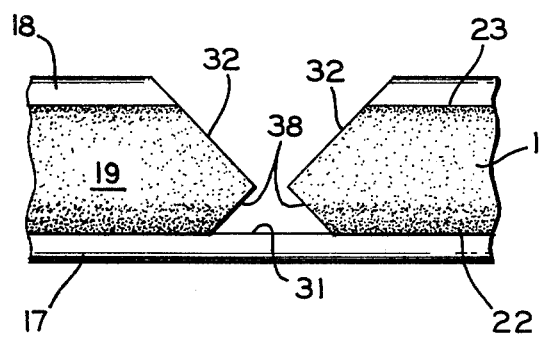
FIG. 10 is a plan view illustrating an alternate embodiment of the invention.
Figure 11:
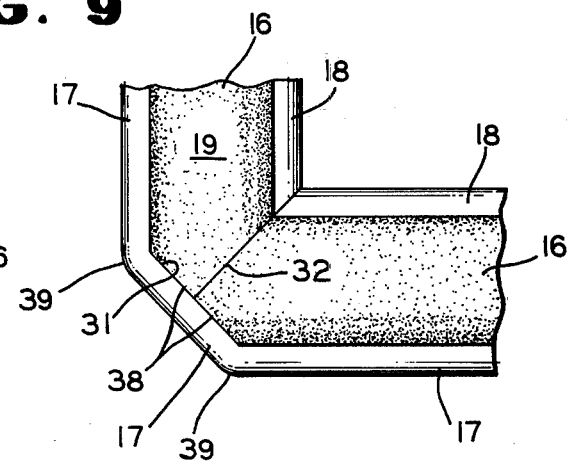
FIG. 11 is a plan view showing the molding strip of FIG. 10 in its deflected position.

In the alternate embodiment of FIGS. 10 and 11, for purposes of illustration the molding strip has been shown as deflected through a 90° or right angle bend. However, it will be understood that the same general configuration could as well be employed in forming acute and obtuse corners. The alternate embodiment differs from those previously described in that instead of having a curved outer edge, the molding strip in its deflected position (FIG. 11) has a straight segment extending diagonally across the outer edge of the corner. In order to form this configuration, a straight line of severance 38 extends from the line of severance 31 to each of the diagonal lines of severance 32 as illustrated in FIG. 10. The lines 38 are perpendicular to the diagonal lines 32 so that in the deflected position as shown in FIG. 11, they are aligned along a straight line. Thus, when the molding strip is deflected to the position of FIG. 11, the side portion 17 forms a continuous straight band across the corner with gently rounded corners 39 opposite the ends of the lines of severance 38. Should it be desired to minimize the rounded corners and provide an abrupt change in direction at that point, inverted V-shaped notches (not shown) may be formed partially across the side portion 17 from its inner edge at the junctions of the lines of severance 38 with the line of demarcation 22. The outer edge of the side portion 17 will thus continue around the bend in the molding strip while it can be deflected more sharply at the point where its direction changes. As with the aforementioned embodiments, the ends of the side portion 18 and central portion 16 created by the diagonal lines of severance 32, as well as the walls created by the severance lines 31 and 38, are pulled together in tightly abutting relationship by the side portion 17 (FIG. 11) so that a joint of pleasing appearance is created.

The angle at which the diagonal lines of severance 32 extend across the molding strip or, in other words, the angle at which they intersect the longitudinal axis and edge of the side portion 18, will be one half the included angle to which the strip is to be deflected. In order to maintain proportions which have a pleasing appearance, the width diagonally across the corner in the deflected position is preferably about equal to the width of the molding strip. Thus, as best seen in FIG. 11, the length of the diagonal lines of severance 32 from the edge of the molding strip to the perpendicular line of severance 38 is such that their length, plus the transverse width of the edge portion 17, is about equal to the width of the molding strip.

It is to be understood that the forms of the invention herewith shown and described are to be taken as illustrative embodiments only of the same, and that various changes in the shape, size and arrangement of parts, as well as various procedural changes, may be resorted to without departing from the spirit of the invention.

We claim:

1. In a method of forming a corner in an elongated decorative and protective molding strip for application to a supporting surface, the improvement comprising the steps of making a longitudinal cut through said strip spaced inwardly from and parallel to one side edge of said strip forming a continuous side portion therealong, making diagonal cuts partially across said strip from the other side edge in the form of a V with its apex midway between the ends of said longitudinal cut and its sides intersecting said other edge transversely across from the ends of said longitudinal cut, making a connecting cut through said strip from each end of said longitudinal cut to an intersection with the corresponding one of said diagonal cuts, removing the portion of said strip bounded by said longitudinal, diagonal and connecting cuts, and deflecting said molding strip to bring the edge walls formed by said diagonal cuts and the edge walls formed by said connecting and longitudinal cuts into abutting relationship, with said side portion forming a continuous band around the exterior of said corner.

2. A method of forming a corner as claimed in claim 1, wherein said connecting cuts are along straight lines.

3. A method of forming a corner as claimed in claim 1, wherein said connecting cuts follow arcuate paths.

4. A method of forming a corner as claimed in claim 3, wherein said arcuate cuts are circular segments.

5. In a method of forming a corner in an elongated decorative and protective molding strip for application to a supporting surface, the improvement comprising the steps of determining the angle to be included in said corner, cutting a V-shaped notch from one side edge of said strip with the sides of said notch each making an angle equal to ½ of said included angle with said one edge, making a longitudinal cut through said strip parallel to and spaced inwardly from the other side edge of said strip opposite said notch, thereby forming a continuous side portion along said other edge, making a connecting cut through said strip from each end of said longitudinal cut to intersect the corresponding side of said notch, and removing the portions of said strip included in said notch and bounded by said longitudinal and connecting cuts.

6. A method of forming a corner as claimed in claim 5, including the step of deflecting said molding strip at said notch to bring the side walls of said notch as well as the side walls formed by said longitudinal and connecting cuts, into abutting relationship, with said side portion forming a continuous band around the outside of said corner.

7. A method of forming a corner as claimed in claim 6, wherein said connecting cuts are linear.

8. A method of forming a corner as claimed in claim 6, wherein said connecting cuts are circular with a radius equal to the width of said strip minus the width of said side portion, the centers of said circular cuts being located at the points where the sides of said V-shaped notch intersect said one side edge of said strip.

9. A method of forming a corner as claimed in claim 8, wherein said circular cuts are tangent to the ends of said longitudinal cut at points located transversely across said strip from said centers.

10. In a decorative and protective molding strip for mounting upon a supporting surface along a predetermined path, the improvement comprising a continuous elongated resilient member having portions removed at a selected location therealong forming a corner portion to permit mounting of said continuous strip to follow said path, said removed portions including a V-shaped notch extending inwardly from one side edge of said strip and generally triangular portions spaced from the other side edge and contiguous with said V-shaped notch.

11. A decorative and protective molding strip as claimed in claim 10, wherein said corner portion includes a continuous band extending along one side edge of said strip around the exterior of said corner.

12. A decorative and protective molding strip as claimed in claim 11, wherein said removed portions include arcuate portions between said continuous band and said V-shaped notch.

13. In a corner for a decorative and protective molding strip mounted upon a supporting surface, the improvement comprising a molding strip including an elongated resilient member deflected through a predetermined angle at said corner and mounted upon said surface, said resilient member having portions removed at said corner including a V-shaped notch extending inwardly from one side edge and generally triangular portions spaced from the other side edge and contiguous with said notch defining a narrow continuous band along one side edge of said molding strip extending around the outer extremity of said corner, a pair of end walls extending diagonally across said strip in abutting relationship from the other side edge of said strip to the inside of said continuous band, and a pair of connecting walls, one of said connecting walls extending in each direction from the interior end of said abutting end walls in abutting relation with the interior face of said continuous band around said corner.

14. A corner for decorative and protective molding strip as claimed in claim 13, wherein each of said end walls extends diagonally across said strip at an angle to said other side edge thereof equal to ½ the included angle of said corner.

15. A corner for a decorative and protective molding strip as claimed in claim 13, in which said molding strip includes a central portion and a side portion separated by a line of demarcation, and said narrow band comprises said side portion.

16. A corner for a decorative and protective molding strip as claimed in claim 13, wherein said connecting walls are circular, with their radius equal to the width of said molding strip minus the width of said continuous band.

17. A corner for a decorative and protective molding strip as claimed in claim 13, wherein said connecting walls are planar.

* * * * *

UNITED STATES PATENT AND TRADEMARK OFFICE
CERTIFICATE OF CORRECTION

PATENT NO. : 4,160,052
DATED : July 3, 1979
INVENTOR(S) : Brian T. Krysiak et al It is certified that error appears in the above—identified patent and that said Letters Patent are hereby corrected as shown below:

Name of Assignee should read "LOF Plastics Inc."

Column 1, line 14, "3,439,905" should read -- 3,439,950 --

Column 1, line 65, "is" should read -- in --.

Signed and Sealed this

Sixteenth Day of October 1979

[SEAL]

Attest:

RUTH C. MASON
*Attesting Officer*

LUTRELLE F. PARKER
*Acting Commissioner of Patents and Trademarks*